(12) United States Patent
Xiao

(10) Patent No.: US 11,477,419 B2
(45) Date of Patent: Oct. 18, 2022

(54) APPARATUS AND METHOD FOR IMAGE DISPLAY

(71) Applicant: Nokia Technologies Oy, Espoo (FI)

(72) Inventor: Zhen Xiao, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/054,995

(22) PCT Filed: May 17, 2018

(86) PCT No.: PCT/CN2018/087298
§ 371 (c)(1),
(2) Date: Nov. 12, 2020

(87) PCT Pub. No.: WO2019/218302
PCT Pub. Date: Nov. 21, 2019

(65) Prior Publication Data
US 2021/0218940 A1 Jul. 15, 2021

(51) Int. Cl.
*H04N 13/339* (2018.01)
*H04N 9/31* (2006.01)
(Continued)

(52) U.S. Cl.
CPC ....... *H04N 9/3152* (2013.01); *G02B 26/0858* (2013.01); *H04N 9/3144* (2013.01);
(Continued)

(58) Field of Classification Search
CPC .. H04N 9/3152; H04N 9/3144; H04N 13/339; G02B 26/0858; G02B 27/0172; G02B 2027/0127; G02B 30/52
(Continued)

(56) References Cited

U.S. PATENT DOCUMENTS 3,632,866 A * 1/1972 King ............... H04N 13/363
348/51
5,907,312 A * 5/1999 Sato ................. G09F 19/18
345/31
(Continued)

FOREIGN PATENT DOCUMENTS

CN 105934902 A 9/2016
CN 106371218 A 2/2017
(Continued)

*Primary Examiner* — Michael Lee
(74) *Attorney, Agent, or Firm* — Harrington & Smith

(57) ABSTRACT

An apparatus and a method for image display include a projection screen, a projection device, a control unit, and an imaging element. The projection screen is movable back and forth along an axis perpendicular to the projection face under control from the control unit. The control unit is configured to divide an image to be projected into a set of sub-images depending on distances, of one or more objects in the image, to be perceived by a user along the axis, and to control the projection screen and the projection device such that the projection device projects the set of sub-images onto the projection face when the projection face is moving to different positions respectively. The imaging optical element is configured to form a virtual image of the respective sub-image when the projection face is moving to the corresponding position.

18 Claims, 7 Drawing Sheets

(51) Int. Cl.
    *G02B 26/08*        (2006.01)
    *G02B 27/01*        (2006.01)
(52) U.S. Cl.
    CPC .. *G02B 27/0172* (2013.01); *G02B 2027/0127* (2013.01); *H04N 13/339* (2018.05)
(58) Field of Classification Search
    USPC .......................................................... 348/744
    See application file for complete search history.

(56) References Cited

U.S. PATENT DOCUMENTS

| | | | |
|---|---|---|---|
| 7,148,859 B2* | 12/2006 | Suyama | H04N 13/366 |
| | | | 345/6 |
| 10,444,838 B2* | 10/2019 | Khoshkava | G06F 1/1684 |
| 2003/0067422 A1 | 4/2003 | Suyama et al. | 345/6 |
| 2010/0271698 A1 | 10/2010 | Kessler | 359/479 |
| 2012/0249408 A1 | 10/2012 | Moliton | 345/156 |
| 2015/0041104 A1* | 2/2015 | De Bock | F04D 33/00 |
| | | | 165/104.34 |
| 2015/0219608 A1 | 8/2015 | Choi et al. | 1/20 |
| 2016/0005951 A1* | 1/2016 | Yoshida | H01L 41/0471 |
| | | | 310/354 |
| 2019/0196187 A1 | 6/2019 | Kasazumi et al. | 29/101 |
| 2021/0011549 A1* | 1/2021 | Ryan | G02B 27/0172 |

FOREIGN PATENT DOCUMENTS

| | | |
|---|---|---|
| CN | 107111142 A | 8/2017 |
| WO | WO-2018051912 A1 | 3/2018 |

\* cited by examiner

APPARATUS AND METHOD FOR IMAGE DISPLAY

CROSS REFERENCE TO RELATED APPLICATION

This patent application is a U.S. National Stage application of International Patent Application Number PCT/CN2018/087298 filed May 17, 2018, which is hereby incorporated by reference in its entirety.

FIELD OF THE INVENTION

Embodiments of the disclosure generally relate to displaying technologies, and more particularly, to an apparatus and a method for image display.

BACKGROUND

Modern computing and display technologies have facilitated the development of systems for so called "virtual reality" or "augmented reality" experience, wherein digitally reproduced images or portions thereof are presented to a user in a manner wherein they seem to be, or may be perceived as, real. A virtual reality, or "VR", scenario typically involves presentation of digital or virtual image information without transparency to other actual real-word visual input; an augmented reality, or "AR", scenario typically involves presentation of digital or virtual image information as an augmentation to visualization of the actual world around the user.

At present, virtual reality and augmented reality have been developed as a technology that is now feasible at low cost via inexpensive device such as mobile phone components. In particular, advances of high-resolution micro displays, and modern GPU (Graphics Processing Unit) facilitate extremely immersive experiences.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, there is provided an apparatus for image display. The apparatus comprises a projection screen, a projection device, a control unit, and an imaging optical element. At least part of the projection screen is movable such that a projection face of the projection screen is capable of moving back and forth along an axis perpendicular to the projection face under control from a control unit. The projection device is configured to project an input from the control unit onto the projection face. The control unit configured to divide an image to be projected into a set of sub-images depending on distances, of one or more objects in the image, to be perceived by a user along the axis, and to control the projection screen and the projection device such that the projection device projects the set of sub-images onto the projection face when the projection face is moving to different positions respectively. The imaging optical element configured to form a virtual image of the respective sub-image when the projection face is moving to the corresponding position at which the respective sub-image is projected.

In an embodiment relating to the apparatus, the projection screen comprises a piezoelectric film which is capable of moving back and forth along the axis when a controlling signal from the control unit is applied thereto. In this embodiment, a surface of the piezoelectric film serves as the projection face.

In an embodiment relating to the apparatus, the projection screen comprises a scatter film, a surface of which serves as the projection face, and an actuating element configured to actuate the scatter film to move back and forth when a controlling signal from the control unit is applied to the actuating element.

In an embodiment relating to the apparatus, the actuating element comprises a piezoelectric film on which the scatter film is fixed.

In an embodiment relating to the apparatus, the actuating element comprises a magnet and an alternating coil on which the scatter film is fixed.

In an embodiment relating to the apparatus, the piezoelectric film comprises a Dual Piezoelectric Cooling Jet (DCJ).

In an embodiment relating to the apparatus, the projection screen is transparent.

In an embodiment relating to the apparatus, the projection screen is located between the projection device and the imaging optical element.

In an embodiment relating to the apparatus, the projection screen is reflective.

In an embodiment relating to the apparatus, the apparatus further comprise a first half mirror located between the projection screen and the imaging optical element. The projection device and the first half mirror are oriented such that light, carrying information about the sub-images, from the projection device is reflected by the first half mirror onto the projection face.

In an embodiment relating to the apparatus, the apparatus further comprise a second half mirror located between the projection device and the imaging optical element. The projection screen is located at a side of the imaging optical element away from the second half mirror. The second half mirror is oriented such that light from the projection screen is reflected by the second half mirror toward user's eyes after transmitting through the imaging optical element.

In an embodiment relating to the apparatus, the projection screen is vacuum packaged into a sealed transparent housing.

In an embodiment relating to the apparatus, the projection face has a moving frequency larger than a critical flicker frequency of the user's eyes.

In an embodiment relating to the apparatus, the moving frequency of the projection face ranges from 100 Hz to 2000 Hz.

In an embodiment relating to the apparatus, the sub-images are projected onto the projection face by using one of the following technologies: DLP (Digital Light Processing) projection, laser projection, LED (Light-Emitting Diode) projection and LCoS (Liquid Crystal on Silicon) projection.

In an embodiment relating to the apparatus, the projection device has a depth of field that is 1.5 to 2 times of a moving distance of the projection face.

In an embodiment relating to the apparatus, the imaging optical element comprises a lens or a free-form half mirror.

According to another aspect of the disclosure, there is provided a method for image display. The method comprises: actuating a projection screen such that at least a projection face of the projection screen moves back and forth along an axis perpendicular to the projection screen; dividing an image to be projected into a set of sub-images depending on distances, of one or more objects in the image, to be perceived by a user along the axis; and projecting the set of sub-images onto the projection face when the projection face is moving to different positions respectively, such that a virtual image of the respective sub-image is formed by a imaging optical element when the projection face is moving to the corresponding position at which the respective sub-image is projected.

In an embodiment relating to the method, the projection screen comprises a piezoelectric film which is capable of moving back and forth along the axis when an alternating electrical signal is applied thereto, and wherein a surface of the piezoelectric film serves as the projection face.

In an embodiment relating to the method, the projection screen comprises a scatter film, a surface of which serves as the projection face; and an actuating element configured to actuate the scatter film to move back and forth when an actuating signal is applied to the actuating element.

In an embodiment relating to the method, the actuating element comprises a piezoelectric film on which the scatter film is fixed.

In an embodiment relating to the method, the actuating element comprises a magnet and an alternating coil on which the scatter film is fixed.

In an embodiment relating to the method, the piezoelectric film comprises a Dual Piezoelectric Cooling Jet.

In an embodiment relating to the method, wherein the projection screen is transparent.

In an embodiment relating to the method, the projection screen is reflective.

In an embodiment relating to the method, the projection screen is vacuum packaged into a sealed transparent housing.

In an embodiment relating to the method, the projection face has a moving frequency larger than a critical flicker frequency of the user's eyes.

In an embodiment relating to the method, the moving frequency of the projection face ranges from 100 Hz to 2000 Hz.

In an embodiment relating to the method, the sub-images are projected onto the projection face by using one of the following technologies: DLP projection, laser projection, LED projection and LCoS projection.

According to another aspect of the disclosure, there is provided an apparatus. The apparatus comprises at least one processor; and at least one memory including computer-executable code, wherein the at least one memory and the computer-executable code are configured to, with the at least one processor, cause the apparatus to operate: actuating a projection screen such that at least a projection face of the projection screen moves back and forth along an axis perpendicular to the projection screen; dividing an image to be projected into a set of sub-images depending on distances, of one or more objects in the image, to be perceived by a user along the axis; and projecting the set of sub-images onto the projection face when the projection face is moving to different positions respectively, such that a virtual image of the respective sub-image is formed by a imaging optical element when the projection face is moving to the corresponding position at which the respective sub-image is projected.

According to another aspect of the disclosure, there is provided a computer program product. The computer program product comprises at least one non-transitory computer-readable storage medium having computer-executable program instructions stored therein, the computer-executable program instructions being configured to, when being executed, cause an apparatus to operate: actuating a projection screen such that at least a projection face of the projection screen moves back and forth along an axis perpendicular to the projection screen; dividing an image to be projected into a set of sub-images depending on distances, of one or more objects in the image, to be perceived by a user along the axis; and projecting the set of sub-images onto the projection face when the projection face is moving to different positions respectively, such that a virtual image of the respective sub-image is formed by a imaging optical element when the projection face is moving to the corresponding position at which the respective sub-image is projected.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "include" and grammatical variations are to be interpreted inclusively rather than exclusively, unless such a construction is clearly prohibited from the context. Where used herein the term "example" particularly when followed by a listing of terms is merely exemplary and illustrative, and should not be deemed to be exclusive or comprehensive.

Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
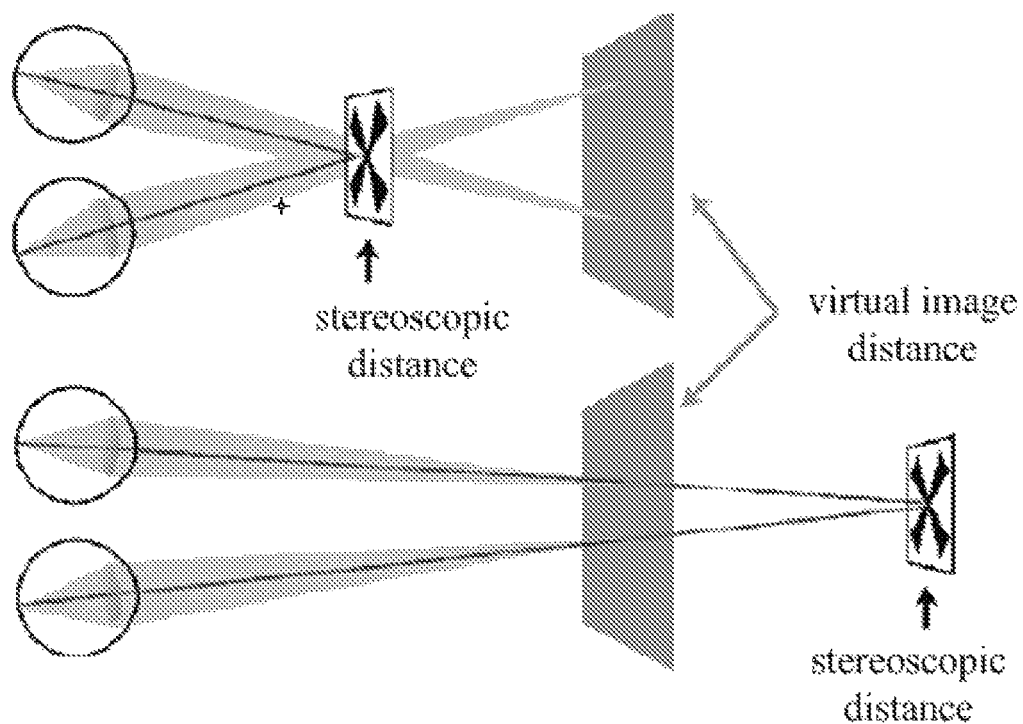
FIG. 1A is a schematic view showing accommodation-convergence conflict.

Near eye display (for example, head-mounted display) is a typically example using virtual reality and augmented reality technologies. In near eye display technologies, stereoscopic displays provide binocular disparity that supports convergence on any point but only allows the user to accommodate on the fixed display surface and thus suffer from accommodation-convergence conflict. These displays often decouple the accommodation cue from the convergence cue and tie the accommodation cue to a fixed distance. FIG. 1A is a schematic view showing accommodation-convergence conflict. As illustrated in FIG. 1A, since a single display for providing image source is fixed at a plane, the virtual image appears at a constant virtual image distance (accommodation cue). However, by presenting different images to the two eyes, objects may be simulated at arbitrary stereoscopic distance (convergence cue). To experience clear and single vision in VR and AR, the user's eyes have to rotate to verge at the correct stereoscopic distance, but the eyes must maintain accommodation at the virtual image distance. Thus accommodation-convergence conflict may occur, which easily causes visual fatigue, dizziness, and other discomforts. To facilitate comfortable long-term experiences and wide-spread user acceptance, the convergence-accommodation conflict inherent to stereoscopic displays, especially to the VR or AR display will have to be solved.

Figure 1B:
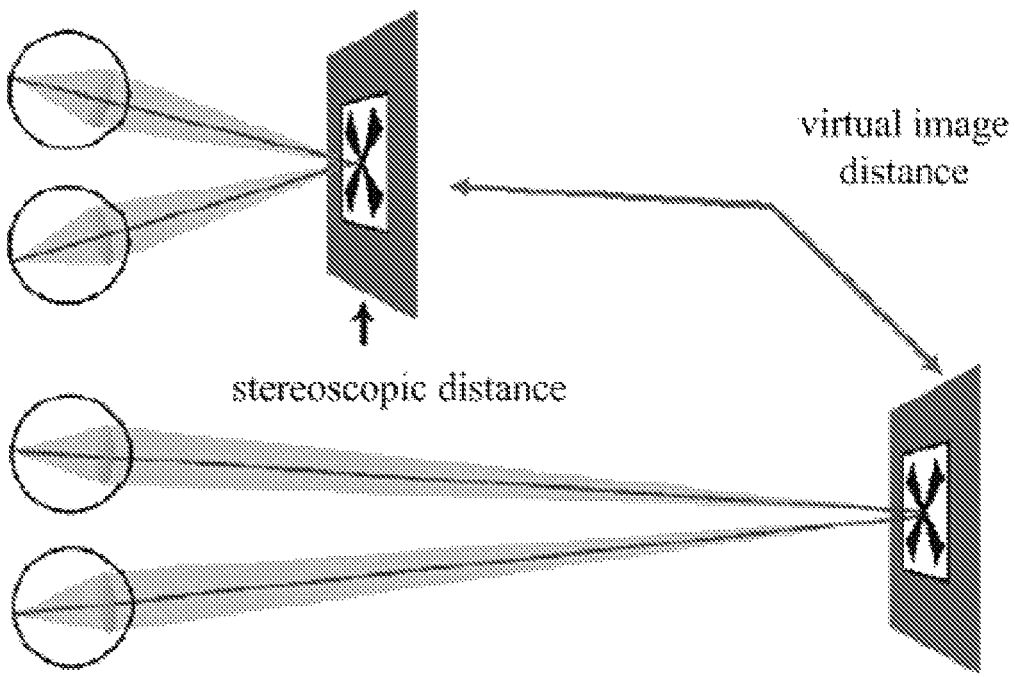
FIG. 1B is a schematic view without convergence-accommodation conflict.

FIG. 1B is a schematic view without convergence-accommodation conflict. As seen from FIG. 1B, in order to match accommodation cue with convergence cue to eliminate accommodation-convergence conflict, it is needed that the virtual image distance is constantly updated to match the stereoscopic distance of the objects.

There are a number of technical improvements in VR or AR technology to solve convergence-accommodation conflict. However, these technologies are accompanied with their own drawbacks such as reduced image resolution, reduced field of view (FOV) or high cost. In one example technical improvement, digital light field technology is used. As an example of the digital light field technology, two stacked transparent liquid crystal displays modulate the uniform backlight in a multiplicative fashion. In this way, when observed through a pair of lenses, the display provides focus cues in addition to binocular disparity afforded by VR displays. However, the computational complexity of such near eye light field display is very high, which may reach above $O(N^2)$ to $O(N^3)$. For high resolution and high refresh rate, huge computing power is needed. In addition, due to the diffraction of transparent pixels, the resolution may be reduced. Another technical improvement is imaging with multifocal lenses such as multifocal liquid lenses. However, the focal points of the multifocal lenses interfere with each other. For example, when seeing in the near field, the light from the far focal is out of focus, resulting in blurred image. Furthermore, the diameters of the lenses are usually small, thus resulting in a reduced FOV.

Existing technologies to solve the accommodation-convergence conflict such as digital light field technology varifocal lens and holographic display technology generally aim to allow the human eye to see image clearly during accommodation by fully simulating the direction of light from objects at different positions. Nevertheless, allowing the user's eye to see images clearly during accommodation does not mean that objects located out of the focal plane have to be blurred at the same time. The issue of the accommodation-convergence conflict of user's eye may also be solved if visually clearly images may be created at various locations. Therefore, the issue of the accommodation-convergence conflict may be solved with large depth of field (DOF) display.

An aspect of the present disclosure proposes an apparatus for image display, which may solve the convergence-accommodation conflict with low technical effort, low cost and high image quality.

In example embodiments of the present disclosure, the apparatus may be a near eye display. However, it shall be appreciated that the apparatus provided in embodiments of the present disclosure is not limited to the near eye display, and it may be other type of apparatuses having the convergence-accommodation conflict.

Figure 2:
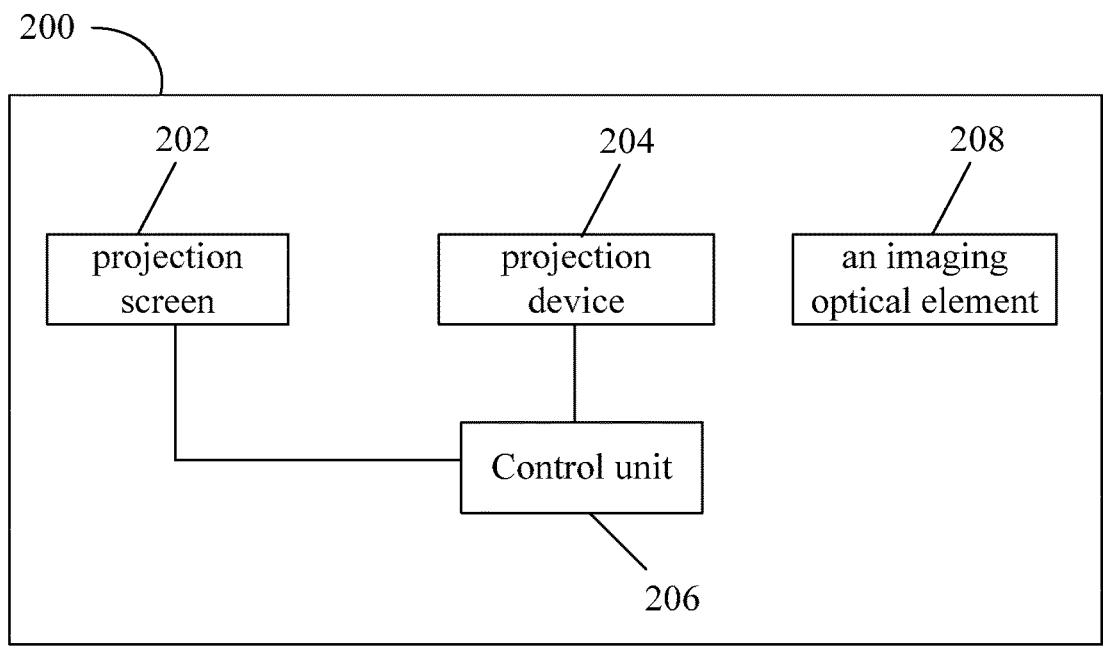
FIG. 2 is a schematic block diagram of an apparatus for image display in some embodiments of the present disclosure.
Figure 3:
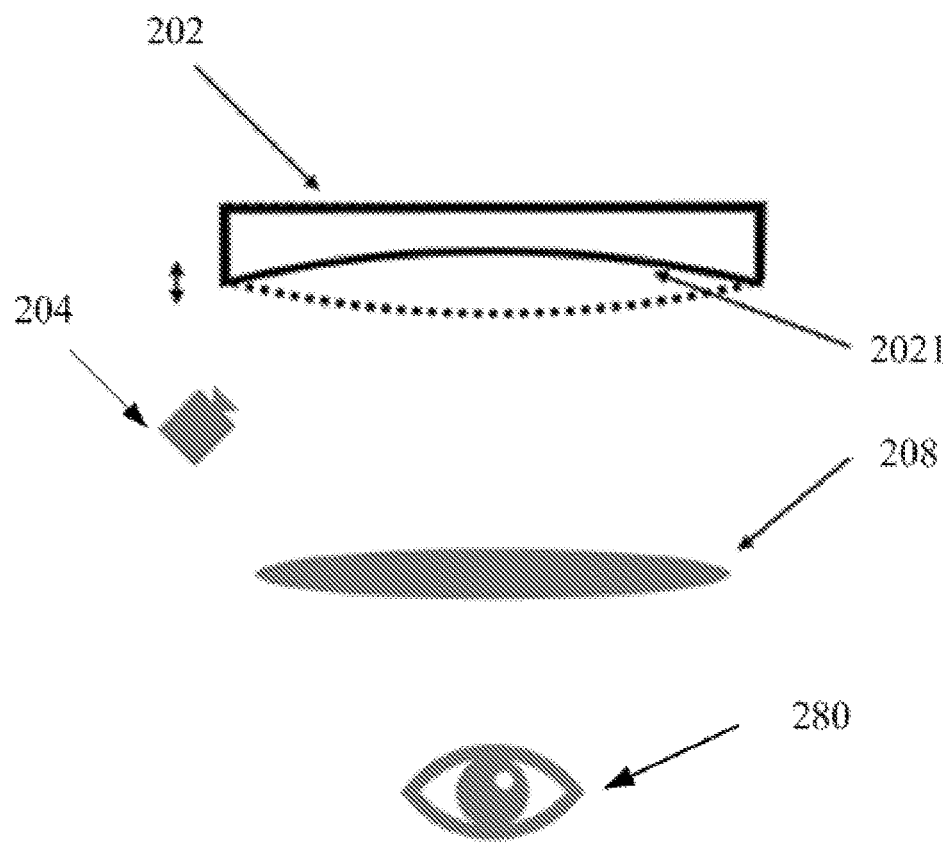
FIG. 3 is a schematic view of an apparatus for image display in some embodiments of the present disclosure.

FIG. 2 is a schematic block diagram of an apparatus for image display in some embodiments of the present disclosure, and FIG. 3 is a schematic view of an apparatus for image display in some embodiments of the present disclosure. As shown in FIG. 2 and FIG. 3, the apparatus 200 may include a projection screen 202, a projection device 204, a control unit 206 (not shown in FIG. 3) and an imaging optical element 208. At least part of the projection screen 202 is movable such that a projection face 2021 of the projection screen 202 may move back and forth along an axis perpendicular to the projection face 2021 under control from the control unit 206. The projection device 204 may be configured to project an input (such as an image or a sub-image) from the control unit onto the projection face 2021 of the projection screen 202. The control unit 206 may be configured to divide an image to be projected into a set of sub-images depending on distances, of one or more objects in the image, to be perceived by a user along the axis, and to control the projection screen and the projection device such that the projection device projects the set of sub-images onto the projection face 2021 of the projection screen 202 when the projection face 2021 is moving to different positions respectively. The imaging optical element 208 may be configured to form a virtual image of the respective sub-image when the projection face 2021 of the projection screen 202 is moving to the corresponding position at which the respective sub-image is projected.

As used herein, "distance (s) to be perceived" may be distance (s) from the virtual object perceived by a user using the apparatus provided in example embodiments of the disclosure to the user's eyes or the imaging optical element, which may correspond to the stereoscopic distance(s) as illustrated in FIGS. 1A and 1B. "The virtual image distance" herein may be a distance from the virtual image plane of the virtual object to the user's eyes or the imaging optical element.

In some embodiments, the projection face 2021 of the projection screen 202 may move back and forth at a high speed. Sub-mages having long depth of field may be projected onto the moving projection face 2021 of the projection screen 202, so that a user may see a clear image throughout the entire visual zooming range.

Figure 4A:
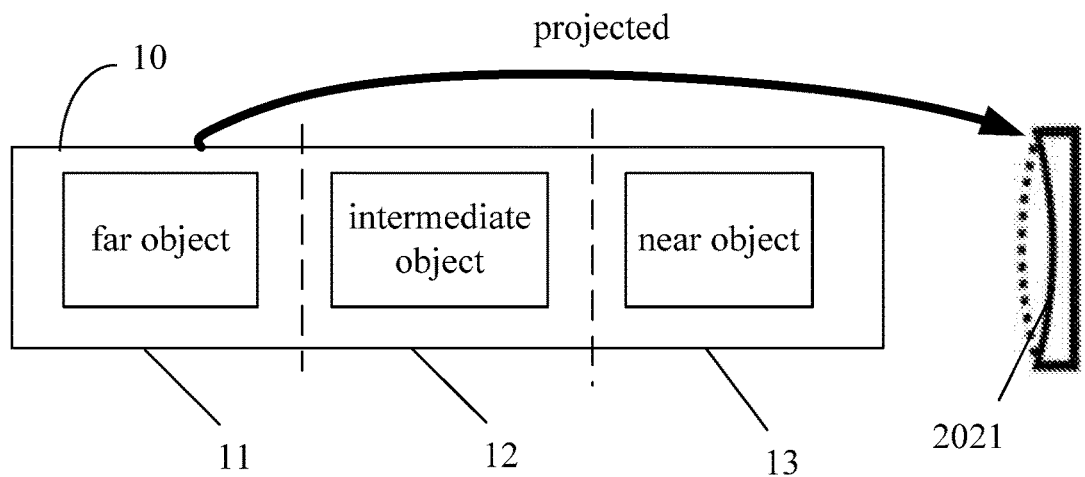
FIGS. 4A-4C are schematic views showing the projection of three sub-images onto the projection face of the projection screen when the projection face 2021 is moving to three different positions.
Figure 4B:
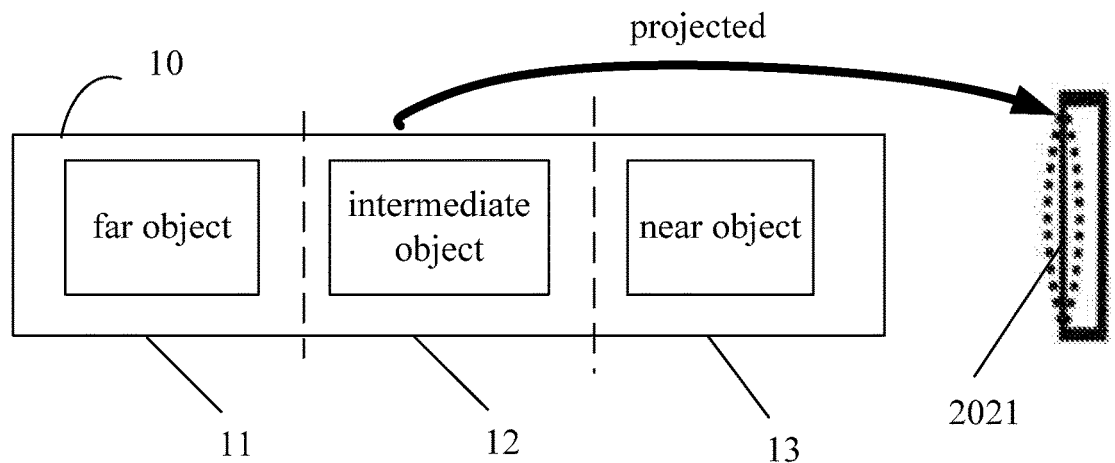
Figure 4C:
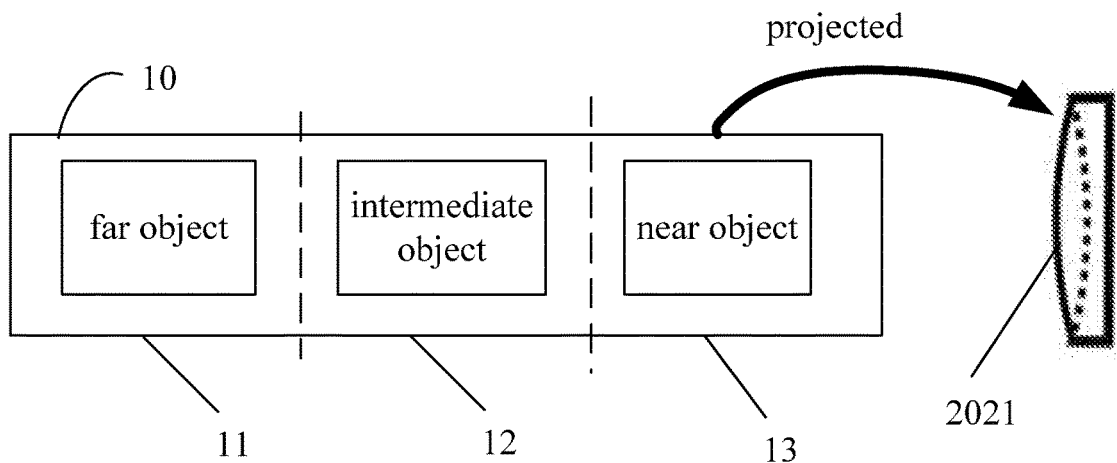

FIGS. 4A-4C are schematic views showing the projection of three sub-images onto the projection face 2021 of the projection screen 202 when the projection face 2021 is moving to three different positions. By way of example, as shown in FIGS. 4A-4C, in an image 10 to be projected, there may be a first object (i.e., far object) at a far stereoscopic distance to be perceived by a user, a second object (i.e., intermediate object) at an intermediate stereoscopic distance to be perceived by a user, and a third object (near object) at a near stereoscopic distance to be perceived by a user, as shown in FIGS. 4A-4C. In this example, the image may be divided/sliced into three sub-images, including a first sub-image 11 containing the far object, a second sub-image 12 containing the intermediate object, and a third sub-image 13 containing the near object. The three sub-images 11, 12, 13 may be projected onto the projection face 2021 when the projection face 2021 is moving to three different positions respectively. For example, the first sub-image 11 containing the far object is projected onto the projection face 2021 when the projection face 202 is moving to a farthest position to the imaging optical element 208 (FIG. 4A), the second sub-image containing the intermediate object is projected onto the projection face 2021 when the projection face 2021 is moving to an intermediate position to the imaging optical element 208 (FIG. 4B), and the third sub-image containing the near object is projected onto the projection face 2021 when the projection face 2021 is moving to a closest position to the imaging optical element 208 (FIG. 4C).

By this way, visually clearly images corresponding different distance of objects may be created at various locations. In the case that the user's eyes gaze at the far object in the first sub-image through the imaging optical element 208, the virtual image distance of the far object may substantially consistent with the stereoscopic distance of the far object. Accordingly, the user may clearly see the far object with less visual fatigue, dizziness, and other discomforts. Similarly, in the case that the user's eyes gaze at the near object or the intermediate object through the imaging optical element, he/she may also clearly see the near object or the intermediate object with less visual fatigue, dizziness, and other discomforts.

Figure 5A:
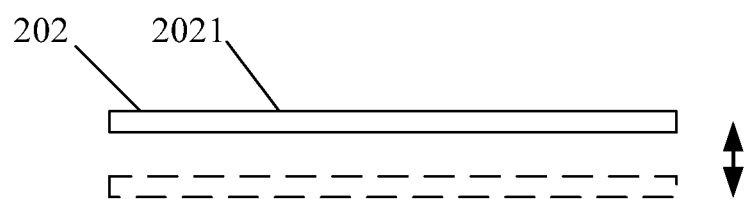
FIG. 5A is a schematic view of the projection screen in an example embodiment of present disclosure.

As described above, the projection face 2021 of the projection screen 202 may move back and forth under control from a control unit 206. FIG. 5A is a schematic view of the projection screen 202 in an example embodiment of present disclosure. In the example embodiment shown in FIG. 5A, the projection screen 202 may move as a whole. As an example may be implemented as a piezoelectric film, one surface of which may be serves as the projection face 2021. The piezoelectric film may produce, based on a converse piezoelectric effect, a mechanical vibration when a controlling signal (for example, an alternating voltage, or an alternating current) from the control unit 206 is applied thereto, as shown in FIG. 5A.

Figure 5B:
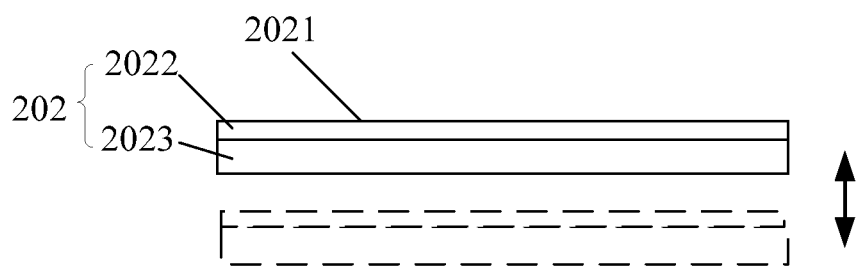
FIG. 5B is a schematic view of the projection screen in another example embodiment.

FIG. 5B is a schematic view of the projection screen in another example embodiment. In the another example embodiment, the projection screen 202 may include a scatter film 2022, a surface of which serves as the projection face 2021; and an actuating element 2023 configured to actuate the scatter film 2022 to move back and forth when a controlling signal from the control unit 206 is applied to the actuating element 2023. As an example, the actuating element 2023 may be or include a piezoelectric film on which the scatter film is attached or coated. The piezoelectric film may produce a mechanical vibration when an alternating electrical signal is applied, and thus the scatter film may also vibrate with the piezoelectric film and act as the projection film onto which the sub-images may be projected, as shown in FIG. 5B. As another example, the actuating element 2023 may include a magnet and an alternating coil. The scatter film may be fixed on the alternating coil. In the case that a controlling signal such as an alternating voltage signal is provided by control unit 206 to the alternating coil, the alternating coil may provide an alternating magnetic field. The alternating magnetic field may interact with the fixed magnetic field of the magnet, which causes the scattering film to vibrate.

Figure 5C:
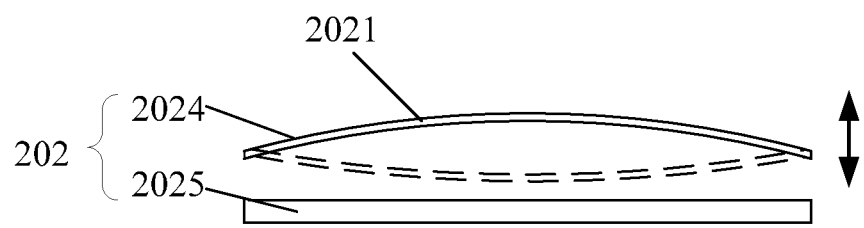
FIG. 5C is a schematic view of the projection screen in still another example embodiment of present disclosure.

FIG. 5C is a schematic view of the projection screen in still another example embodiment of present disclosure. In the example embodiment of FIG. 5C, the projection screen 202 may include a Dual Piezoelectric Cooling Jet. As an example, the Dual Piezoelectric Cooling Jet may include a first piezoelectric layer 2024 and a second piezoelectric layer 2025 separated from each other, one or both of which may mechanically vibrate when an alternating electrical signal is applied (the situation that one of the layers vibrate is shown in FIG. 5C). As another example, one of the piezoelectric layers of the Dual Piezoelectric Cooling Jet may be replaced by a metal layer or a transparent material layer. Alternatively, similarly as FIG. 4B, a scatter film may be attached or coated on the surface of the Dual Piezoelectric Cooling Jet, as the projection film of the sub-images.

In embodiments of the present disclosure, the Dual Piezoelectric Cooling Jet may also be utilized as a cooling element to cool other heat-generating electronics of the apparatus therein, since it may acts as a miniature pair of bellows, i.e., expanding to suck cool air, and then contracting to expel hot air.

In order to demonstrate particular effects, advantages and feasibility of the present invention the piezoelectric film and optical scatter film are, in general, employed herein as exemplary structure or element of projection screen 202 which representation is, however, not intended to limit the scope of the present invention to this specific structure or element. By virtue of this example, the skilled person may rather easily recognize how to adapt the related parameters and conditions when employing a different structure or element of the projection screen 202.

In some example embodiments, the projection face 2021 of the projection screen 202 may move back and forth at a high frequency higher than a critical flicker frequency of the user's eyes, such that the user will not perceive the sub-image flicker in the case that he is seeing a sub-image at a particular position of the projection face 2021, and thus he can clearly see the object on the corresponding sub-image. As an example, the moving frequency of the projection face 2021 may range from 100 Hz to 2000 Hz.

As such, the projection screen 202, especially the projection face, may move back and forth at a very high speed, which will produce a relatively loud noise. In order to eliminate the noise due to the high speed moving of the projection screen, the projection screen may be vacuum packaged into a sealed transparent housing.

In some embodiments, the projection screen 202 specifically, the projection face 2021 with 40 mm diameter may move by a distance of 0.5 mm. However, it shall be appreciated that the projection screen 202 with a larger diameter may have a larger distance of movement, for example, 1-2 mm.

With respect to the projection technologies used by the projection device 204 to project sub-images onto the projection screen, any existing technology, such as DLP projection and laser projection, LED projection or LCoS projection, may be used for this purpose, and it is not a limitation to the present disclosure. DLP projection and laser projection may have a large DOF of projection, such that the sub-image may be kept within the DOF of the projection when the projection screen is moving. Even if LED projection and LCoS projection are used for projection, the DOF may be extended by reducing the aperture.

The requirement on the DOF of the projection device 204 is not strict since the movable range of the projection face 2021 is generally short, and thus may be easily achieved with the existing projection technologies. In some optional embodiments, the DOF of the projection device 204 may be about 1.5 to 2 times of a moving distance of the projection face 2021, such that a clear sub-image may be projected on the projection face 2021 during the projection face 2021 is moving in its moving range.

In embodiments of the present disclosure, the control unit 206 may provide a control signal to the projection screen 202 to enable the projection face 2021 of the projection screen 202 to move. In the embodiment that the projection screen 202 includes a piezoelectric film, the control unit 206 may provide an alternating electrical signal to the piezoelectric film to move back and forth. In the embodiment that the projection screen 202 includes a scatter film 2022 and an actuating element 2023, the control unit 206 may provide an actuating signal to the actuating element, such that the actuating element 2023 actuates the scatter film 2022 to move back and forth.

As described above, the control unit 206 may further be configured to divide an image to be projected into a set of sub-images depending on distances (stereoscopic distances), of one or more objects in the image, to be perceived by a user along the axis. In an example embodiment, the control unit 206 may comprise a processor unit which may implement at least a part of functions of the control unit 206, such as image dividing function. By way of example, several stereoscopic distance ranges (for example, a first stereoscopic distance range, a second stereoscopic distance range, and a third stereoscopic distance range) may be predetermined for each image to be projected. The control unit 206 (specifically, a processor unit) may divide the image into a set of sub-images according to the predetermined stereoscopic ranges. For example, there are a tree, a building, and a hill in an image to be perceived within the first, second and the third stereoscopic distance ranges respectively, then the image may be divided into a first sub-image containing the tree, a second sub-image containing the building, and a third sub-image containing the hill.

The control unit 206 is further configured to control the projection screen 202 and the projection device 204 such that the projection device 204 projects the set of sub-images onto the projection face 2021 of the projection screen 202 when the projection face 2021 is moving to different positions respectively. Continue to the above example, the first sub-image containing the tree may be projected onto the projection face 2021 when the projection face 2021 is moving to the first position, the second sub-image containing the building may be projected onto the projection face 2021 when the projection face 2021 is moving to the second position, and the third sub-image containing the hill may be projected onto the projection face 2021 when the projection face 2021 is moving to the third position. By this way, in the case that the user's eyes gaze at the virtual image of the tree in the first sub-image through an imaging optical element, he will clearly see the virtual image of the tree, since the projection screen is moving at a high frequency. Furthermore, the moving of the projection face 2021 may create visually clearly images at various locations, the virtual image distance may easily match with the stereoscopic distance, and thus accommodation-convergence conflict may be solved.

To be noted that the manner of dividing image and the manner of projecting sub-images described herein are merely for purpose of illustration. It is not intended to be exhaustive or to limit the application. By virtue of this example, the skilled person may rather easily recognize how to adapt the related parameters and conditions when employing different manners of dividing image and projecting sub-images.

In an example embodiment, the control unit 206 may include a first control unit and a second control unit. The first control unit may be connected to or integrated into the projection screen 202 to control the projection screen 202 to move back and forth. As described above, in the case that the projection screen 202 includes a single piezoelectric film, the first control unit may provide an alternating electrical signal (for example, an alternating voltage, or an alternating current) to the piezoelectric film, such that the piezoelectric film moves back and forth. In the case that the projection screen 202 includes an actuating element and a scatter film, the first control unit may provide a control signal to the actuating element, such that the actuating element mechanically actuates the scatter film to move back and forth. The second control unit may be connected to or integrated into the projection device 204 to divide an image to be projected into a set of sub-images according to distances of one or more objects to be perceived by a user and to control which sub-image is projected onto the projection face 2021 when the projection face 2021 is moving a particular position.

In another example embodiment, the projection screen and the projection device may share a single control unit 206.

The control unit 206 herein may be implemented as: (a) hardware-only circuit such as implemented as only analog and/or digital circuit; (b) combinations of circuits and software (and/or firmware), such as a combination of digital signal processor(s), software, and memory(ies) that work together to cause various functions to be performed.

In some embodiments, the sub-images on the projection screen 202 (especially the projection face 2021) may be magnified and transmitted into the eye 280 of the user using an imaging optical element 208 such as a lens or a free-form half mirror. The lens being used may have a short focal length so that the range of movement of the virtual image may be large when the projection screen is moving, and thereby satisfying common requirements of the user in accommodating between a near point and a far point.

Hereinafter, three example apparatuses for image display provided by embodiments of the present disclosure will be described in detail with reference to FIGS. 6 to 8.

Figure 6:
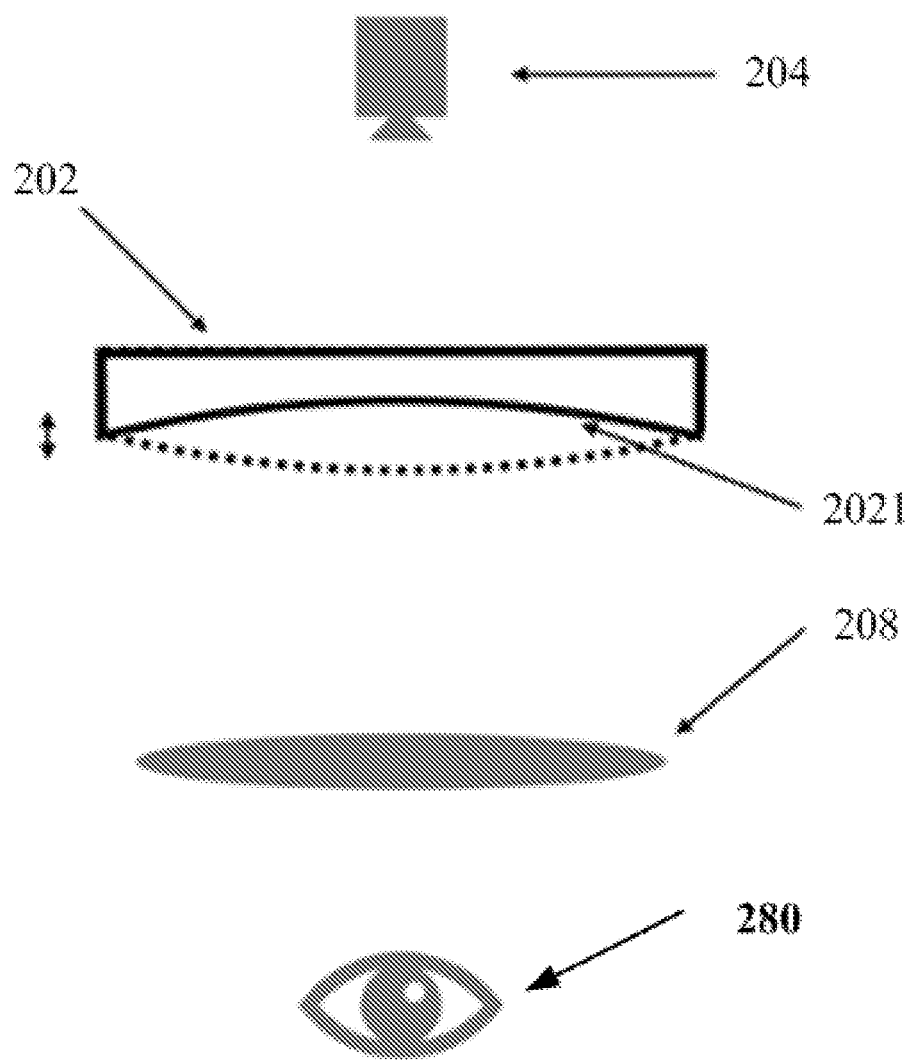
FIG. 6 is a schematic view of an example apparatus for image display in a first embodiment of the present disclosure.

FIG. 6 is a schematic view of an example apparatus for image display in a first embodiment of the present disclosure. The apparatus illustrated in FIG. 6 may be used for example as a VR display. As illustrated in FIG. 6, the example apparatuses may include a projection screen 202, a projection device 204, an imaging optical element (for example, a lens) 208 and a control unit (not shown in FIG.

6). The projection screen 202 may be located between the projection device 204 and the imaging optical element 208. As described above, the projection face 2021 of the projection screen 202 may move back and forth along axis perpendicular to the projection face 2021 under control from a control unit. The control unit divides an image to be projected into a set of sub-images depending on distances, of one or more objects in the image, to be perceived by a user along the axis. The projection device projects the sub-images onto the projection face 2021 when the projection face 2021 is moving to different positions respectively. In this embodiment, the light carrying the sub-image information impinges on the projection screen 202 directly, such that different sub-images are projected onto the projection face 2021 when the projection face 2021 is at different position. The sub-images on the projection face 2021 may be magnified and transmitted by the lens 208 into the eye 280 of the user in front of the lens 208, so the user may clearly see a virtual reality scenario without visual fatigue, dizziness, and other discomforts.

In order that the user can see the virtual image of an object through the lens, the projection screen 202 in the embodiment may be transparent. By way of example, in the case that the projection screen 202 includes the piezoelectric film or the Dual Piezoelectric Cooling Jet, the electrode of the piezoelectric film or the Dual Piezoelectric Cooling Jet may be made of transparent material to facilitate projection.

Figure 7:
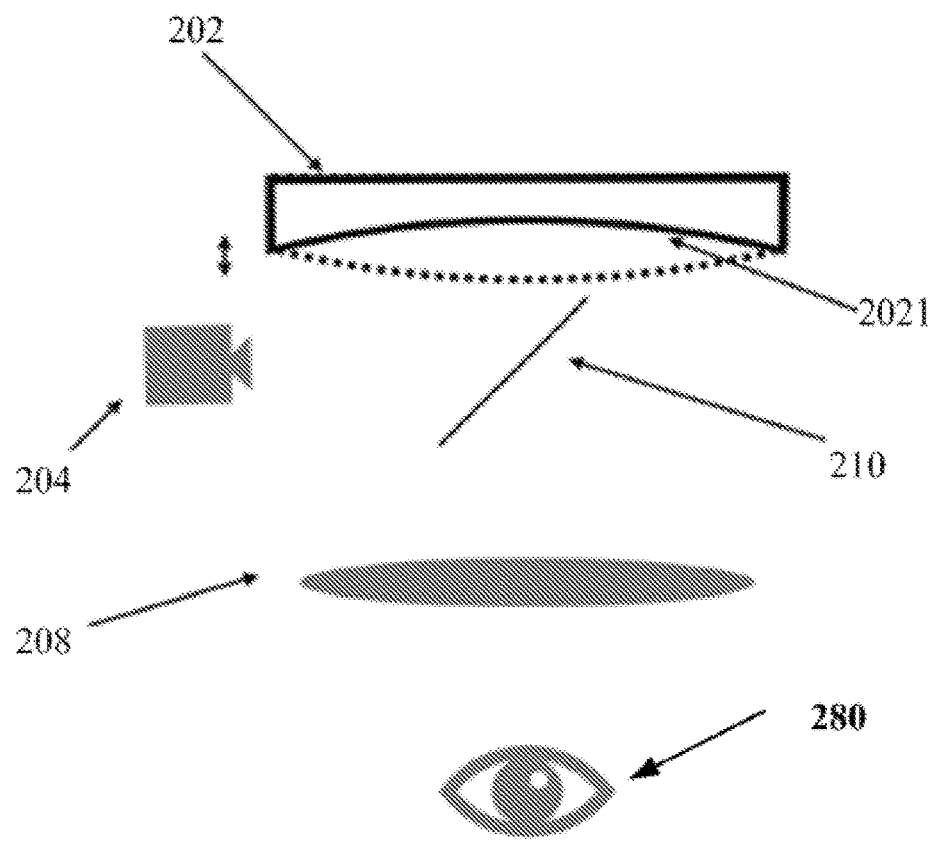
FIG. 7 is a schematic view of an example apparatus for image display in a second embodiment of the present disclosure.

FIG. 7 is a schematic view of an example apparatus for image display in a second embodiment of the present disclosure. The apparatus illustrated in FIG. 7 may also be used as a VR display. In addition to the components contained in the embodiment illustrated in FIG. 5, the apparatus illustrated in FIG. 7 may further include a first half mirror 210 located between the projection screen 202 and the lens 208. Further, the projection device 204 and the first half mirror 210 are oriented such that light, carrying information about the sub-images, from the projection device 204 is reflected by the first half mirror 210 onto the projection screen 202, specifically the projection face 2021. For example, the first half mirror 210 may be tilted at an angle of 45° with respect to the optical axis of the lens 208, and the projection device 204 is positioned so that the sub-images are projected onto the projection screen 202 after being reflected by the first half mirror. In this embodiment, the light carrying the sub-image information from the projection device 204 is reflected by the first half mirror 210, and then impinges on the projection screen, such that different sub-images are projected onto the projection face 2021 when the projection face 2021 is at different position. The sub-images on the projection face 2021 may be transmitted and magnified by the lens into the eye 280 of the user in front of the lens 208, so the user may see a virtual reality scenario without visual fatigue, dizziness, and other discomforts.

In order that the user can see the virtual image of an object through the lens, the projection screen 202 in this embodiment may be reflective, such that the light from the projection device 204 may be reflected by the projection screen 202 toward the lens. By way of example, in the case that the projection screen 202 includes the piezoelectric film or the Dual Piezoelectric Cooling Jet, the electrode of the piezoelectric film or the Dual Piezoelectric Cooling Jet may be a metal shim.

Figure 8:
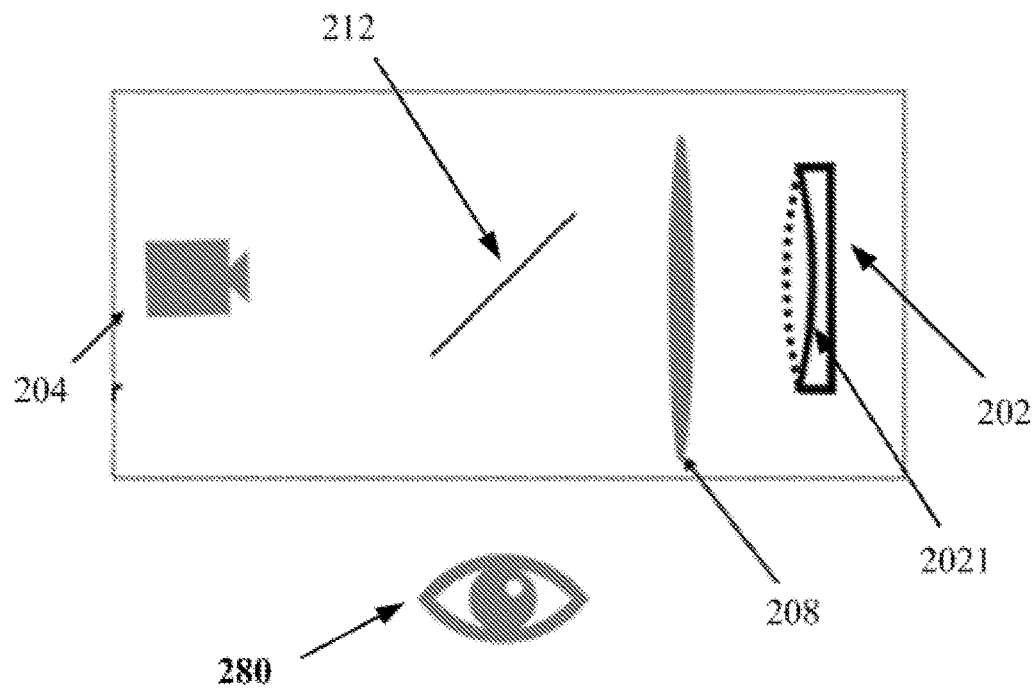
FIG. 8 is a schematic view of an example apparatus for image display in a third embodiment of the present disclosure.

FIG. 8 is a schematic view of an example apparatus for image display in a third embodiment of the present disclosure. The apparatus illustrated in FIG. 8 may be used as an AR display. In addition to the components contained in the embodiment illustrated in FIG. 6, the apparatus illustrated in FIG. 8 may further include a second half mirror 212 located between the projection device 204 and the lens 208. Here, the projection screen 202 is located at a side of the lens 208 away from the second half mirror 212, and the lens 208 and the second half mirror 212 are oriented such that light from the projection screen 202 is reflected by the second half mirror 212 into user's eye 280 after transmitting through the lens 208. For example, the second half mirror 212 may be tilted at an angle of 45° with respect to the optical axis of the lens 208. In this embodiment, the light carrying the sub-image information from the projection device 204 impinges on the projection screen 202 after passing through the second half mirror 212 and the lens 208, such that different sub-images are projected onto the projection face 2021 when the projection face 2021 is at different position. The sub-images on the projection face 2021 may be magnified and transmitted by the lens 208 and the second half mirror 212 into the eye 280 of the user, so the user may see an augmented reality scenario without visual fatigue, dizziness, and other discomforts.

Similar with the embodiment shown in FIG. 7, the projection screen 202 in this embodiment may be reflective, such that the light from the projection device 204 may be reflected by the projection screen 202 through the lens, then is reflected by the second half mirror 212 into user's eye 280. By way of example, in the case that the projection screen 202 includes the piezoelectric film or the Dual Piezoelectric Cooling Jet, the electrode of the piezoelectric film or the Dual Piezoelectric Cooling Jet may be a metal shim.

The apparatuses illustrated in FIGS. 6-8 are merely example embodiments, the apparatuses may include other optical components in addition to those shown in FIGS. 6-8, or some of components shown in FIGS. 6-8 may also be replaced by other optical components suitable for implementing the present disclosure.

According to one or more of the embodiments disclosed above and/or below in further detail, at least the projection face 2021 of the projection screen 202 may move back and forth along an axis perpendicular to the projection face 2021, and the projection device 204 may project the respective sub-images on the projection face when the projection face is moving to different positions. Therefore, the virtual image distances (accommodation cues) corresponding to different objects in one image will not be tied to a single fixed distance. It is possible that the virtual image distance may substantially match with the stereoscopic distance of the object, so the accommodation-convergence conflict may be solved. Furthermore, the piezoelectric film may be used as an actuating element to make at least the projection face of the projection screen move, which is simple and low cost. Miniature projectors may be used as the projection device, which are widely available in the market. The slicing/dividing display in present disclosure does not require the use of Non-negative matrix factorization (NMF) as in digital light field technologies, which is often greater than $O(N^2)$. Therefore, the computing complexity of the solution in present disclosure may be greatly reduced. In addition, the resolution and the FOV of the apparatus in embodiments of the present disclosure are not less than other VR/AR display technologies.

Another aspect of the present disclosure proposes a method for image display. Optionally, the method may make use of the apparatus according to the present disclosure, such as of the apparatus according to one or more of the embodiments disclosed above and/or below in further detail. Thus, for optional embodiments of the method, reference might be made to the embodiments of the apparatus. The method comprises the following steps, which may be performed in the given order or in a different order. Further, additional method steps might be provided which are not listed. Further, two or more or even all of the method steps might be performed at least partially simultaneously. Further, a method step might be performed twice or even more than twice, repeatedly.

Figure 9:
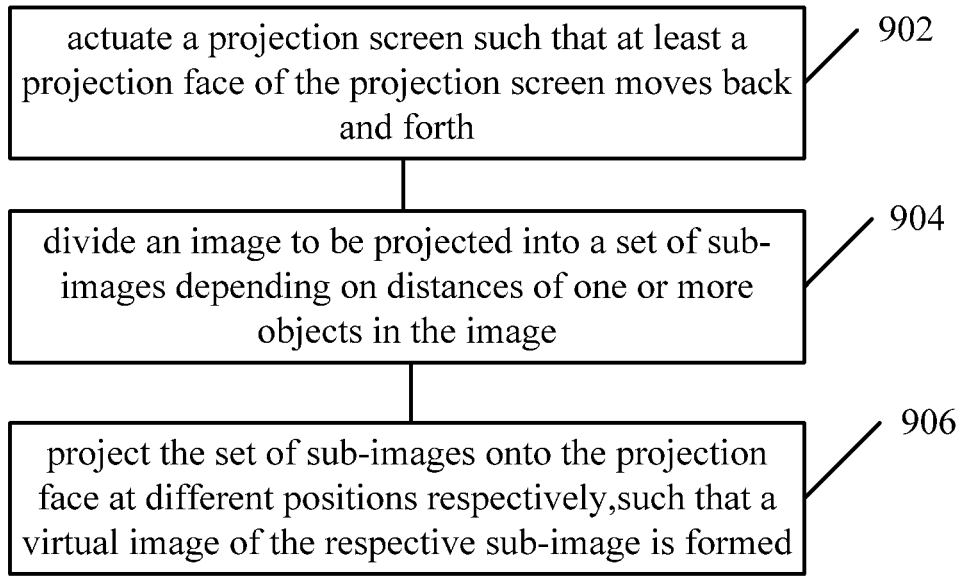
FIG. 9 is a flow chart depicting a method for image display according to an embodiment of the present disclosure.

FIG. 9 is a flow chart depicting a method for image display according to an embodiment of the present disclosure. As shown in FIG. 9, the method may comprise the following steps:

step 902, actuating a projection screen such that at least a projection face of the projection screen moves back and forth along an axis perpendicular to the projection screen;

step 904, dividing an image to be projected into a set of sub-images depending on distances, of one or more objects in the image, to be perceived by a user along the axis; and step 906, projecting the set of sub-images onto the projection face when the projection face is moving to different positions respectively, such that a virtual image of the respective sub-image is formed by a imaging optical element when the projection face is moving to the corresponding position at which the respective sub-image is projected.

At step 902, the projection face of the projection screen may move back and forth along an axis perpendicular to the projection screen under control from a control unit. As described in other places of the disclosure, the projection screen may include a piezoelectric film, and the control unit may provide a control signal such as an alternating electrical signal to enable the piezoelectric film to move back and forth. Alternatively, the projection screen may further include a scatter film fixed (for example, attached or coated) on the piezoelectric film. The scatter film may move with the piezoelectric film under an alternating electrical signal is applied thereto. Other embodiments may be feasible. For example, a magnet and an alternating coil may function as the actuating element for the projection screen.

In some embodiments, the moving frequency of the projection face may be higher than a critical flicker frequency of the user's eyes. As an example, the moving frequency of the projection face may range from 100 Hz to 2000 Hz. As described above, the projection screen may be vacuum packaged into a sealed transparent housing, to eliminate the noise due to the high speed moving of the projection screen.

At step 904, an image to be projected may be divided into a set of sub-images depending on distances, of one or more objects in the image, to be perceived. In a specific embodiment, a control unit (for example, a processor) may be used to determine the distances of one or more objects in an image to be perceived by a used, i.e., stereoscopic distances of the one or more objects, then divide the image into multiple sub-images according to the stereoscopic distances. As an example, the image to be projected may be divided into three sub-images including a far object, an intermediate object, and a near object respectively. Other embodiments are also feasible. For example, the image to be projected may be divided into more than three sub-images.

At step 906, the set of sub-images may be projected onto the projection screen when the projection screen is moving to different positions respectively, such that a virtual image of the respective sub-image is formed by a imaging optical element when the projection face is moving to the corresponding position at which the respective sub-image is projected. In a specific embodiment, a control unit (for example, a processor) may be used to control which sub-image from the set of sub-images is projected during the projection face is moving, such that the respective sub-images may be projected onto the projection face when the projection face is moving to different positions respectively. In the case of three sub-images, the three sub-images may be projected when the projection face is moving to three different positions. Specifically, the first sub-image may be projected at the first position of the projection face, the second sub-image may be projected at the second position of the projection face, and the third sub-image may be projected at the third position of the projection face. Then, a virtual image of the respective sub-image may be formed, such as by using an imaging optical element, for example, a lens or a free-form half mirror.

With the method described in embodiments or the present disclosure, an image to be projected may be sliced into multiple sub-images such that the respective sub-images may be projected onto the projection face when the projection face is moving to different positions. Therefore, the virtual image distances (accommodation cues) corresponding to different objects in one image will not be tied to a single fixed distance, and visually clearly images may be created at various locations. It is possible that the virtual image distance may substantially match with the stereoscopic distance of the object, so the user may clearly see a virtual image of the object without visual fatigue, dizziness, and other discomforts. Thus, the accommodation-convergence conflict may be solved.

Figure 10:
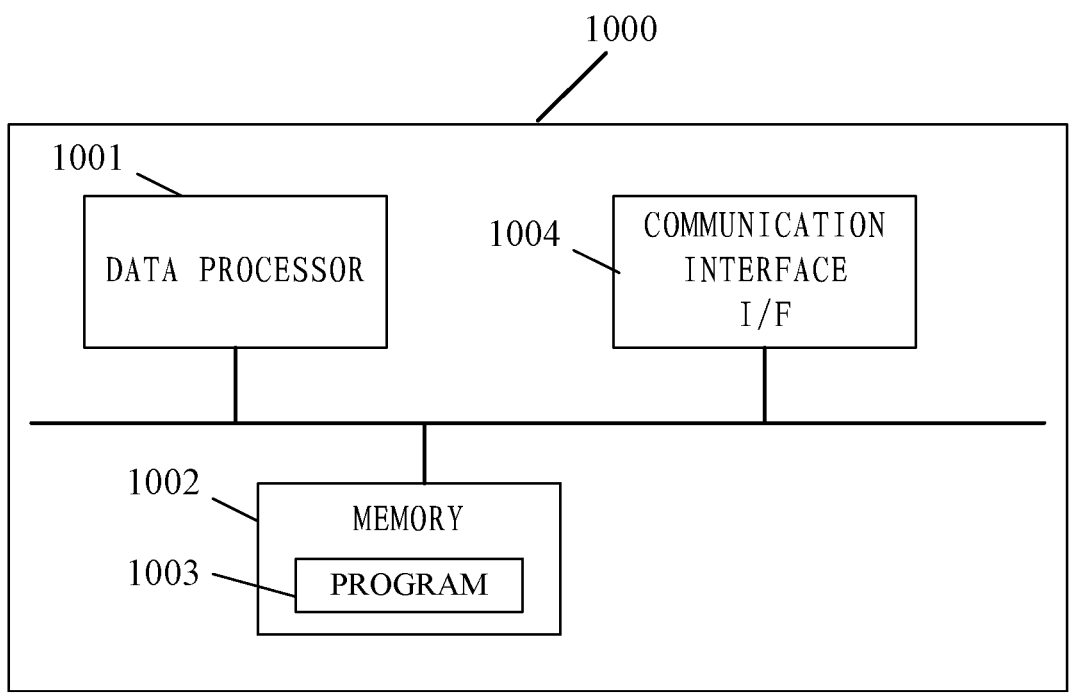
FIG. 10 is a simplified block diagram showing an apparatus suitable for use in some embodiments of the present disclosure.

Another aspect of the present disclosure proposes an apparatus suitable for use in some embodiments of the present disclosure. FIG. 10 is a simplified block diagram showing an apparatus suitable for use in some embodiments of the present disclosure. As shown in FIG. 10, the apparatus 1000 may include a data processor 1001, a memory 1002 that stores a program 1003, and a communication interface 1004 for communicating data with other external devices through wired and/or wireless communication.

The program 1003 is assumed to include program instructions that, when executed by the data processor 1001, enable the apparatus 1000 to operate in accordance with the embodiments of this disclosure, as discussed above. That is, the embodiments of this disclosure may be implemented at least in part by computer software executable by the data processor 1001, or by hardware, or by a combination of software and hardware.

The memory 1002 may be of any type suitable to the local technical environment and may be implemented using any suitable data storage technology, such as semiconductor based memory devices, flash memory, magnetic memory devices and systems, optical memory devices and systems, fixed memory and removable memory. The data processor 1001 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An apparatus for image display, comprising:
    a projection screen, wherein at least part of the projection screen is movable such that a projection face of the projection screen is capable of moving back and forth along an axis perpendicular to the projection face under control from a control unit, wherein the projection screen comprises a piezoelectric member which is capable of moving back and forth along the axis when a controlling signal from the control unit is applied thereto;
    a projection device configured to project an input from the control unit onto the projection face;
    the control unit configured to divide an image to be projected into sub-images depending on distances, of one or more objects in the image, to be perceived by a user along the axis, and to control the projection screen and the projection device such that the projection device projects the respective sub-images onto the projection face when the projection face is moving to different positions respectively;
    an imaging optical element configured to form a virtual image of the respective sub-image when the projection face is moving to the corresponding position at which the respective sub-image is projected; and
    a dual piezoelectric cooling jet, wherein the dual piezoelectric cooling jet comprises the piezoelectric member of the projection screen.

2. The apparatus according to claim 1, wherein the piezoelectric member comprises a piezoelectric film which is capable of moving back and forth along the axis when the controlling signal from the control unit is applied thereto, and wherein a surface of the piezoelectric film serves as the projection face.

3. The apparatus according to claim 1, wherein the projection screen comprises:
    a scatter film, a surface of which serves as the projection face; and
    an actuating element configured to actuate the scatter film to move back and forth when the controlling signal from the control unit is applied to the actuating element, wherein the actuating element comprises the piezoelectric member which comprises a piezoelectric film on which the scatter film is fixed.

4. The apparatus according to claim 1, wherein the projection screen is transparent, wherein the projection screen is located between the projection device and the imaging optical element.

5. The apparatus according to claim 1, wherein the projection screen is reflective.

6. The apparatus according to claim 5, further comprise a first half mirror located between the projection screen and the imaging optical element, wherein the projection device and the first half mirror are oriented such that light, carrying information about the sub-images, from the projection device is reflected by the first half mirror onto the projection face.

7. The apparatus according to claim 5, further comprise a second half mirror located between the projection device and the imaging optical element, wherein the projection screen is located at a side of the imaging optical element away from the second half mirror, and wherein the second half mirror is oriented such that light from the projection screen is reflected by the second half mirror toward user's eyes after transmitting through the imaging optical element.

8. The apparatus according to claim 1, wherein the projection screen is vacuum packaged into a sealed transparent housing.

9. The apparatus according to claim 1, wherein the projection face is configured to be moved with a moving frequency larger than a critical flicker frequency of a user's eyes, wherein the moving frequency of the projection face ranges from 100 Hz to 2000 Hz.

10. The apparatus according to claim 1, wherein the sub-images are configured to be projected onto the projection face by using at least one of the following technologies:
    DLP projection,
    laser projection,
    LED projection, or
    LCoS projection.

11. The apparatus according to claim 1, wherein the projection device has a depth of field that is 1.5 to 2 times of a moving distance of the projection face.

12. The apparatus according to claim 1, wherein the imaging optical element comprises a lens or a free-form half mirror.

13. A method for an image display, comprising:
- actuating a projection screen such that at least a projection face of the projection screen moves back and forth along an axis perpendicular to the projection screen, wherein the projection screen comprises a piezoelectric member which is capable of moving back and forth along the axis when an alternating electrical signal is applied thereto;
- dividing an image to be projected into sub-images depending on distances, of one or more objects in the image, to be perceived by a user along the axis;
- projecting the respective sub-images onto the projection face when the projection face is moving to different positions respectively, such that a virtual image of the respective sub-image is formed by a imaging optical element when the projection face is moving to the corresponding position at which the respective sub-image is projected; and
- causing cooling of at least a portion of the image display with use of a dual piezoelectric cooling jet, wherein the dual piezoelectric cooling jet comprises the piezoelectric member.

14. The method according to claim 13, wherein the piezoelectric member comprises a piezoelectric film, and wherein a surface of the piezoelectric film serves as the projection face.

15. The method according to claim 13, wherein the projection face has a moving frequency larger than a critical flicker frequency of a user's eyes, wherein the moving frequency of the projection face ranges from 100 Hz to 2000 Hz.

16. The method according to claim 13, wherein the sub-images are projected onto the projection face by using at least one of the following technologies:
- DLP projection,
- laser projection,
- LED projection, or
- LCoS projection.

17. An apparatus, comprising:
- at least one processor; and
- at least one non-transitory memory including computer-executable code,
- wherein the at least one memory and the computer-executable code are configured to, with the at least one processor, cause the apparatus to operate:
  - actuating a projection screen such that at least a projection face of the projection screen moves back and forth along an axis perpendicular to the projection screen, wherein the projection screen comprises a piezoelectric member which is moved back and forth along the axis when a controlling signal from a control unit is applied thereto;
  - dividing an image to be projected into sub-images, depending on distances, of one or more objects in the image, to be perceived by a user along the axis; and
  - projecting the respective sub-images onto the projection face when the projection face is moving to different positions respectively, such that a virtual image of the respective sub-image is formed by a imaging optical element when the projection face is moving to the corresponding position at which the respective sub-image is projected,
  - causing cooling of the at least one processor and the at least one memory with use of a dual piezoelectric cooling jet, wherein the dual piezoelectric cooling jet comprises the piezoelectric member of the projection screen which is configured to cause the cooling as the projection piezoelectric member of the projection screen is moved by the controlling signal.

18. A computer program product comprising at least one non-transitory computer-readable storage medium having computer-executable program instructions stored therein, the computer-executable program instructions being configured to, when being executed, cause an apparatus to perform the method of claim 13.

* * * * *